UNITED STATES PATENT OFFICE.

FRANK S. WASHBURN, OF NASHVILLE, TENNESSEE.

PROCESS OF TREATING COMMERCIAL CALCIUM CYANAMID.

1,053,761.   Specification of Letters Patent.   Patented Feb. 18, 1913.

No Drawing.   Application filed June 3, 1912.   Serial No. 701,379.

*To all whom it may concern:*

Be it known that I, Frank S. Washburn, a citizen of the United States, residing at Nashville, in the county of Davidson and State of Tennessee, have invented certain new and useful Improvements in Processes of Treating Commercial Calcium Cyanamid; and I do hereby declare the following to be a full, clear, and exact description of the invention, such as will enable others skilled in the art to which it appertains to make and use the same.

This invention relates to a process of treating commercial calcium cyanamid commonly known as lime nitrogen, and has for its object to produce an improved product which will be free from the disadvantages now found to accompany the shipping, storing, mixing with other fertilizer material, as well as sowing of the present product upon the soil.

To these ends the invention consists in the novel steps constituting my process as well as in the improved resulting product, all as will be more fully hereinafter disclosed and particularly pointed out in the claims.

In order that my invention may be more clearly understood the above obstacles that are encountered may be briefly summarized as follows:—During shipping and storing the lime nitrogen often swells and bursts its containers; upon mixing the lime nitrogen with phosphates and other materials to form fertilizers some of the phosphoric acid of said phosphates is or may be changed from a soluble to an insoluble form; and during this step of compounding fertilizers as well as upon sowing or spreading the lime nitrogen upon the soil its very fine dust is objectionable both to the workmen as well as to the farmer. The reason for the bursting of the bags resides in the fact that unhydrated lime-nitrogen contains among other things when made about 20% of calcium oxid, CaO, or caustic lime; and the commercial calcium cyanamid or hydrated lime-nitrogen contains among other things about 25% of calcium hydrate $Ca(OH)_2$ and not infrequently a few per cent. of calcium oxid. Therefore the commercial lime nitrogen takes up moisture of the air, the mass thereupon swells, and sometimes bursts the containers. In addition to the lime above mentioned commercial calcium cyanamid contains say about 25 per cent. of calcium chemically combined by rather weak bonds in the form of $CaCN_2$, as well as other ingredients not necessary to discuss, and the reason why upon mixing with phosphatic materials lime nitrogen tends to cause a reversion of the soluble phosphoric acid into the insoluble form resides in the fact that the calcium hydrate $Ca(OH)_2$ and the free lime CaO, as well as the calcium cyanamid $CaCN_2$ are found to have a tendency to change soluble forms of phosphoric acid into insoluble forms when mixed with the ordinary acid phosphate used in making up or compounding fertilizers. Such reversion of course constitutes an objection to the commercial employment of lime nitrogen in such fertilizer mixtures and the tendency to the same will be more readily understood from the following possible equations when free lime is added in different proportions:—

(1) 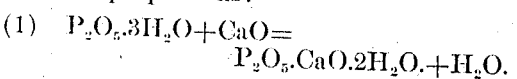
$$P_2O_5.3H_2O + CaO = P_2O_5.CaO.2H_2O + H_2O.$$

A further addition of lime produces (2) $P_2O_5.CaO.2H_2O + CaO =$
$$P_2O_5.2CaO.H_2O + H_2O.$$

A large excess of lime may produce (3) $P_2O_5.2CaO.H_2O + CaO =$
$$P_2O_5.3CaO + H_2O.$$

Similarly calcium hydrate, $Ca(OH)_2$ will react as follows:—

(4) 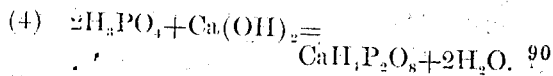
$2H_3PO_4 + Ca(OH)_2 =$
$$CaH_4P_2O_8 + 2H_2O.$$

(5) 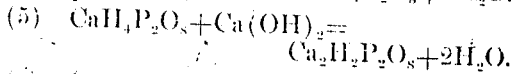
$CaH_4P_2O_8 + Ca(OH)_2 =$
$$Ca_2H_2P_2O_8 + 2H_2O.$$

(6) $Ca_2H_2P_2O_8 + Ca(OH)_2 =$
$$Ca_3P_2O_8 + 2H_2O.$$

In addition to these reactions of reversion there is also another one of importance which can occur as follows:

(7) 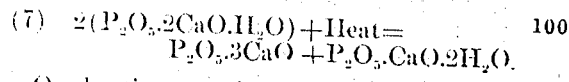
$2(P_2O_5.2CaO.H_2O) + Heat =$
$$P_2O_5.3CaO + P_2O_5.CaO.2H_2O.$$

On heating to about 60° C. or higher reaction (7) proceeds and causes a loss of a portion of the citrate soluble acid by reversion to the insoluble tri-calcium phosphate. As each reaction (1) to (6) inclusive evolves heat it is easy to see that the mass can be readily heated to the requisite temperature for equation (7) to take place even by the presence of a comparatively small amount of lime or even of calcium hydrate. The heat evolution of reactions (4), (5), and (6) are less than those of (1), (2), and (3), the difference being due to the decomposition of the hydrate on the left-hand side of equations (4), (5), and (6). In the process of hydration advantage may be taken of this lower heat of reaction when the product is mixed with acid phosphate, as thereby the reaction (7) is greatly hindered. Specific data giving the heats of formation as well as other chemical data connected with these equations are omitted, for the sake of clearness; but it is said if the lime had been converted into calcium carbonate before mixing with the acid phosphate, reactions of conversion will still take place, but with a much lessened intensity as far as the heat evolution is concerned. The difference in this case is due to the heat absorbed in the decomposition of the carbonate. The reactions involved when calcium carbonate is added in different proportions are:—

(8) 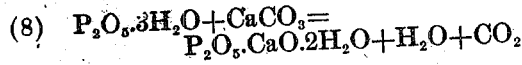

(9) 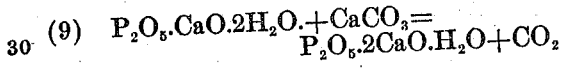

(10) 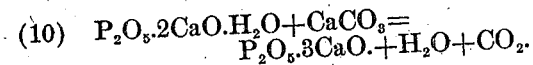

It is not likely that reaction (10) could take place in the case of commericial cyanamid, or lime nitrogen.

The above indicates the marked advantages of combining the lime present with an acid to a stable salt, for the carbonate shows very little or in exceptional cases a negative value for the heat evolved on mixing with the acid phosphate. This of course hinders the development of reaction (7) to a very great extent. We must not lose sight of the fact, however, that the carbon dioxid developed in reactions (8) to (10) inclusive can react on cyanamid according to the following equations:—

(11) $CaCN_2 + H_2O + CO_2 = H_2CN_2 + CaCO_3$

(12) $CaCN_2 + 2H_2O + CO_2 = CaCO_3 + CO(NH_2)_2$.

Both these reactions evolve heat and help to raise the temperature of the mixture when allowed to take place. The heat evolutions however cannot be given at present because such thermochemical data for cyanamid is lacking.

In addition to the above obstacles that are met with in using lime nitrogen and which are due to the presence of lime CaO, to calcium hydrate $Ca(OH)_2$, or to calcium carbonate $CaCO_3$, calcium cyanamid $CaCN_2$ itself also reverts phosphates according to the reactions:—

(13) 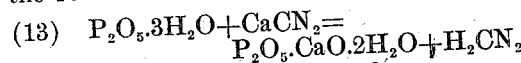

(14) 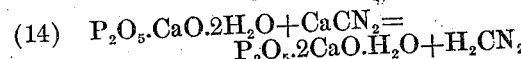

(15) 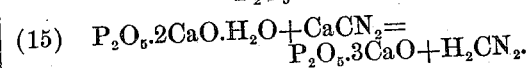

These reactions also evolve heat in considerable amount. Exact data as to the heat evolution is not available, but from my experiments it seems to be about equal to that evolved by calcium hydrate in corresponding reactions.

It thus appears there is a whole series of reactions evolving more or less heat and all tending to raise the temperature of the mixture of acid phosphate and lime nitrogen and to cause a reversion according to one or more of the reactions given. It is therefore apparent if the lime can be combined in a chemical compound the heat evolution and chemical activity will be considerably reduced. The thermal data accompanying the reactions involving the fixation of lime in the carbonate form show this fact clearly. The solution of the reversing problem accordingly resides in an acid that will fix the lime in such a stable form that it will not be decomposed by the acid phosphate. Carbon dioxid is found not quite strong enough in itself, and besides it adds a very large amount of inert material of no fertilizing value. It is also found when lime nitrogen is mixed with ammonium sulfate, owing to an absence of an excess of acid, certain proportions of ammonia are evolved from the sulfate, and therefore a valuable fertilizer constituent is lost.

Various attempts have been made in the past to overcome the bad influence of the free lime in the lime nitrogen. But all of these attempts seem to have been along the line of neutralizing the free lime and forming neutral and stable salts. For example, sulfuric acid has been added to lime nitrogen in sufficient quantity to form calcium sulfate with the free lime present. But while the calcium sulfate possessed the desired qualities to a greater or less degree, the whole operation in practice was found to be complicated and expensive, since it involved the use of an excess of acid and at the same time part of the calcium cyanamid had to be decomposed by the sulfuric acid in order to insure stability. A modification of this acid neutralization is disclosed in the Italian Patent No. 98,374, May 13, 1908 to Barzand and Zanardo, in which the inventors proposed to neutralize the free lime by the use of acid anhydrids in the gaseous form. Similarly, German Patent No. 235,754, June 16, 1909 to O. F. Carlson, proposes to render lime-nitrogen non-caustic by treating it with carbonic acid or carbon dioxid with or without the addition of water. U. S. Patent No. 982,311, January 24, 1911 to Stilleson discloses substantially the same thing. The absorption of carbon dioxid by dry lime nitrogen, however, is a slow operation and promises little success; and although the rate of absorption can be increased by the addition of water before or with the carbon dioxid gas, yet the disadvantage of the carbonated product is that some 10 to 20 per cent. of material of no fertilizing value has to be added to the lime nitrogen, while such carbonated lime nitrogen is not greatly lessened in chemical activity toward acid phosphates and ammonium sulfate. According to my invention, on the other hand, now to be disclosed, the above objections are removed. That is to say I have discovered that if instead of using ordinary water for hydration, one makes use of commercial "stick water" which contains amino acids and is a by-product of the meat packing industry containing various ingredients of an organic nature boiled down to a sort of broth or solution of varying proportions of solids to water, the free lime and probably some of the calcium in the cyanamid (CaCN$_2$), combines with the organic compounds of the stick water which upon evaporation of the water represent the solids therein, in preference to the water present. Combined in this way the active caustic properties of the lime nitrogen are greatly decreased, or entirely neutralized according to the quantity of stick water used. And such treated material shows a less chemical action or tendency to reversion of the phosphoric acid of an acid phosphate. Further, a good influence has been gained through the addition of a material of recognized fertilizing value instead of one of inert character, as heretofore. Liquid stick or stick water, having 50% moisture, contains approximately 7% of nitrogen, and is in the form of a comparatively thin liquid. But in this form, notwithstanding its very high fertilizing value, it is impracticable of use as a fertilizer material until after it has passed through an expensive and complicated evaporating process in which it is transformed into a commercial fertilizer material known as "concentrated tankage." Even when so reduced, it is gummy and soggy and difficult of incorporating with other materials into the product commonly sold to farmers as a fertilizer. This stick water could be replaced by any organic material having similar combining properties with lime, for example such as sugar beet refuse, beet sugar molasses, steep water from starch manufacture, tannery waste, etc. In addition to this neutralization of the free lime, the stick water addition tends to make the particles of the cyanamid or lime nitrogen agglomerate or granulate, and at the same time assists in preventing dusting or floating around of the fine particles. If now a mixture of lime nitrogen and stick water is further treated with carbon dioxid while still in the moist condition, an additional marked decrease in the chemical activity of the product will be noted toward acid phosphates. This decrease of chemical activity is found to be even very marked in such cases where the amount of carbon dioxid absorbed is very materially less than would be required to form calcium carbonate with all the calcium present in the original lime nitrogen or cyanamid. Such mixtures of lime nitrogen and phosphates after the lime nitrogen has been treated with stick water and carbon dioxid show but a slight gain in weight on long standing in the air and the resulting products represent marked improvements over products treated by any of the previously known processes. Lime nitrogen alone when treated with stick water agglomerates or granulates; and similarly the product treated with stick water and carbon dioxid shows agglomeration. Lime nitrogen treated with stick water and carbon dioxid shows decreased dusting properties, as above stated, and it is further found this decrease can be still further emphasized by the addition of a suitable oil to the mass after the treatment with the stick water and the carbon dioxid. Further, by subjecting the calcium cyanamid itself CaCN$_2$ to the action of carbon dioxid CO$_2$ after the treatment with stick water, there being less caustic lime CaO present, it does not require so much gas or other acid anhydrid to convert the calcium cyanamid into the form of the hydrogen cyanamid H$_2$CN$_2$, in accordance with the following equation:—

$$CaCN_2 + H_2O + CO_2 = CaCO_3 + H_2CN_2.$$

In other words, only substantially enough gas is required to carry out this reaction while if free calcium oxid is also present, an additional quantity of gas of course would be required. Of course, urea, CO(NH$_2$)$_2$ as well as other nitrogenous compounds can be economically formed in the same way from the calcium cyanamid.

It will thus be seen that my process enables me to obviate the above objections causing the containers to burst during shipping and storing; causing the atmosphere to be filled with a disagreeable dust during the compounding of fertilizer materials and during the sowing of the lime nitrogen on the soil; and also causing some of the phosphoric acid of the mixed materials to change from the soluble to the insoluble form. Further it will be observed that the lime nitrogen product resulting from my process differs from the present lime nitrogen product in that it contains substantially no free caustic lime, is in an agglutinated or granulated condition instead of in the conditon of a free dusting, very fine impalpable powder; it contains substantially no phosphoric acid in an insoluble form; and it is combined with a nitrogenous material having a fertilizing value.

It is obvious that those skilled in the art may vary my process as well as my improved product without departing from the spirit of my invention, and therefore I do not wish to be limited to the above disclosure except as may be required by the claims.

What I claim is:—

1. The process of neutralizing the free calcium oxid, CaO, carried by commercial calcium cyanamid which comprises causing the same to react with an organic material itself having a fertilizing value; and in treating the mixture with carbon dioxid, $CO_2$, substantially as described.

2. The herein described improved product comprising commercial calcium cyanamid substantially free from free calcium oxid, CaO in an agglutinated condition; and having admixed therewith carbonic acid and stick water, substantially as described.

3. The herein described improved product consisting of commercial calcium cyanamid substantially free from free calcium oxid, CaO in an agglutinated condition; and having admixed therewith stick water and oil, substantially as described.

In testimony whereof, I affix my signature, in presence of two witnesses.

FRANK S. WASHBURN.

Witnesses:
E. J. PRANKE,
H. A. BLACK.